(12) United States Patent
Pedlar et al.

(10) Patent No.: US 8,385,270 B2
(45) Date of Patent: *Feb. 26, 2013

(54) APPARATUS AND METHOD FOR OPERATING A COMMUNICATIONS DEVICE IN A MOBILE COMMUNICATIONS NETWORK

(75) Inventors: David Winstone Pedlar, Solihul (GB); Gjalt Gerrit de Jong, Leuven (BE); Nicola M. Funnell, Cumbria (GB)

(73) Assignee: Research In Motion Limited, Waterloo (CA)

( * ) Notice: Subject to any disclaimer, the term of this patent is extended or adjusted under 35 U.S.C. 154(b) by 183 days.

This patent is subject to a terminal disclaimer.

(21) Appl. No.: 13/028,073

(22) Filed: Feb. 15, 2011

(65) Prior Publication Data
US 2011/0136487 A1    Jun. 9, 2011

Related U.S. Application Data

(63) Continuation of application No. 12/014,550, filed on Jan. 15, 2008, now Pat. No. 7,912,000, which is a continuation of application No. 10/774,059, filed on Feb. 6, 2004, now Pat. No. 7,339,904.

(51) Int. Cl.
*H04W 4/00*    (2009.01)

(52) U.S. Cl. ........................................ 370/328; 370/469

(58) Field of Classification Search .................. 370/310, 370/328, 331, 469; 455/423–425, 436, 67.11
See application file for complete search history.

(56) References Cited

U.S. PATENT DOCUMENTS

| | | | |
|---|---|---|---|
| 5,253,253 A | 10/1993 | Brame et al. | |
| 6,181,704 B1 | 1/2001 | Drottar et al. | |
| 6,400,695 B1 | 6/2002 | Chuah et al. | |
| 6,738,370 B2 | 5/2004 | Ostman | |
| 6,804,206 B1 | 10/2004 | Moulsley | |
| 6,807,426 B2 | 10/2004 | Pankaj | |
| 6,816,478 B1 | 11/2004 | Laroia et al. | |
| 6,868,079 B1 | 3/2005 | Hunt | |
| 6,961,570 B2 | 11/2005 | Kuo et al. | |
| 7,339,904 B2 | 3/2008 | Pedlar et al. | |
| 7,480,267 B2 * | 1/2009 | Funnell et al. | 370/328 |
| 7,525,935 B2 * | 4/2009 | De Jong et al. | 370/328 |
| 7,912,000 B2 * | 3/2011 | Pedlar et al. | 370/328 |
| 2002/0159410 A1 | 10/2002 | Odenwalder et al. | |
| 2002/0191544 A1 | 12/2002 | Cheng et al. | |
| 2003/0007459 A1 | 1/2003 | Yi et al. | |
| 2003/0207702 A1 | 11/2003 | Chen | |
| 2004/0038681 A1 | 2/2004 | Chun | |
| 2004/0203623 A1 | 10/2004 | Wu | |
| 2005/0054298 A1 | 3/2005 | Chen | |
| 2005/0175033 A1 | 8/2005 | Funnell et al. | |
| 2005/0175034 A1 | 8/2005 | De Jong et al. | |

FOREIGN PATENT DOCUMENTS

EP    1383348 A1    1/2004

OTHER PUBLICATIONS

3GPP TS 25.331 V5.7.1 3rd Generation Partnership Project Technical Specification Group Radio Access Network Radio Resource Control RRC Protocol Specification Release 5, Jan. 2004, pp. 1-843, XP002284354.

3G TS 25.331 V3.3.0 3rd Generation Partnership Project Technical Specification Group Radio Access Network RRC Protocol Specification Release 1999, Jun. 2000, pp. 1-509, XP 002284353.

* cited by examiner

*Primary Examiner* — Nguyen Vo

(57) ABSTRACT

Apparatus and a method for handling discard of a service data unit in universal mobile telecommunications system user equipment. Strategies for the radio resource control entity to handle discard of a service data unit by the radio link control entity are presented.

8 Claims, 6 Drawing Sheets

APPARATUS AND METHOD FOR OPERATING A COMMUNICATIONS DEVICE IN A MOBILE COMMUNICATIONS NETWORK

CROSS-REFERENCE TO RELATED APPLICATION

The present application is a continuation application of patent application Ser. No. 12/014,550, filed Jan. 15, 2008, which is a continuation of U.S. patent application Ser. No. 10/774,059, filed Feb. 6, 2004, Now U.S. Pat. No. 7,339,904, the contents of which are incorporated herein by reference.

BACKGROUND

1. Technical Field

This application relates to UMTS (Universal Mobile Telecommunications System) in general, and to an apparatus and method for operating a communications device in a mobile communications network.

2. Description of the Related Art

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In a typical cellular radio system, mobile user equipment (UE) communicates via a radio access radio network (RAN) to one or more core networks. User equipment (UE) comprises various types of equipment such as mobile telephones (also known as cellular or cell phones), lap tops with wireless communication capability, personal digital assistants (PDAs) etc. These may be portable, hand held, pocket sized, installed in a vehicle etc and communicate voice and/or data signals with the radio access network.

The radio access network covers a geographical area divided into a plurality of cell areas. Each cell area is served by at least one base station, which may be referred to as a Node B. Each cell is identified by a unique identifier which is broadcast in the cell. The base stations communicate at radio frequencies over an air interface with the UEs within range of the base station. Several base stations may be connected to a radio network controller (RNC) which controls various activities of the base stations. The radio network controllers are typically connected to a core network.

UMTS is a third generation public land mobile telecommunication system. Various standardization bodies are known to publish and set standards for UMTS, each in their respective areas of competence. For instance, the 3GPP (Third Generation Partnership Project) has been known to publish and set standards for GSM (Global System for Mobile Communications) based UMTS, and the 3GPP2 (Third Generation Partnership Project 2) has been known to publish and set standards for CDMA (Code Division Multiple Access) based UMTS. Within the scope of a particular standardization body, specific partners publish and set standards in their respective areas.

Reference is also directed to 3GPP TSG—Services and System Aspects "Vocabulary for 3GPP Specifications (Release 1999)" 3GPP TS 21.905 v3.2.0 which defines terminology used in this document.

Consider a wireless mobile device, generally referred to as user equipment (UE), that complies with the 3GPP specifications for the UMTS protocol. The 3GPP 25.331 specification, v.3.15.0, referred to herein as the 25.331 specification, addresses the subject of UMTS RRC (Radio Resource Control) protocol requirements between the UMTS Terrestrial Radio Access Network (UTRAN) and the UE. The 3GPP 25.322 specification, v3.15.0, referred to herein as the 25.322 specification, addresses the subject of UMTS RLC (Radio Link Control) protocol requirements between the UMTS Terrestrial Radio Access Network (UTRAN) and the UE.

In accordance with clause 9.7.3 of the 25.322 specification, the RLC layer of the 3G UMTS stack may, in certain circumstances, discard an SDU (Service Data Unit). There are thus proposed strategies for handling the discard of an SDU. A number of such strategies are detailed below.

Other aspects and features of the present invention will become apparent to those ordinarily skilled in the art upon review of the following description of specific embodiments of an apparatus and method for operating a communications device in a mobile communications network.

BRIEF DESCRIPTION OF THE DRAWINGS

Embodiments of the present invention will now be described, by way of example only, with reference to the attached drawings, in which.

The same reference numerals are used in different figures to denote similar elements.

DETAILED DESCRIPTION OF THE DRAWINGS

A method and apparatus for operating a communications device in a mobile communications network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

The needs identified in the foregoing Background, and other needs and objects that will become apparent from the following description, are achieved by, in one aspect, a method for operating a communications device in a mobile communications network. In other aspects, the invention encompasses apparatus and a computer-readable medium configured to carry out the foregoing steps. In particular, the method may be implemented in a mobile telecommunications device, with or without voice capabilities, or other electronic devices such as handheld or portable devices.

Figure 1:
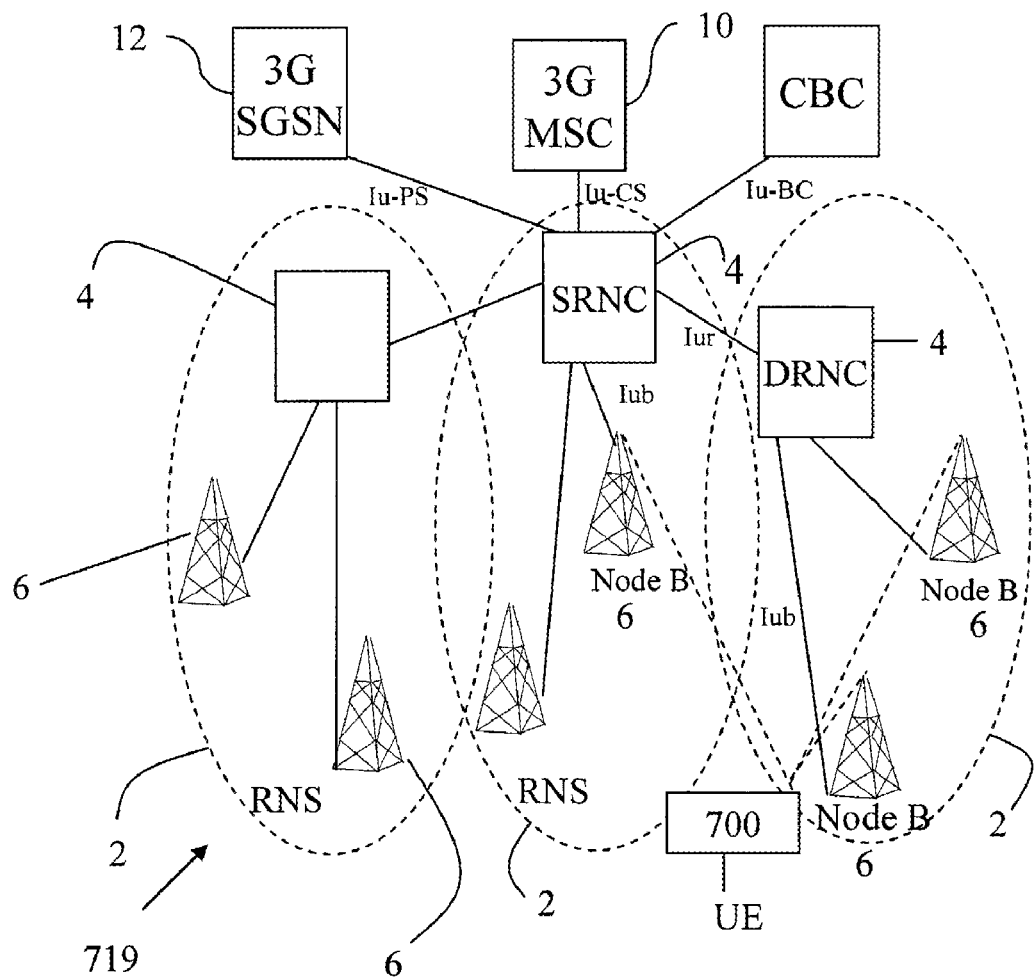
FIG. 1 is shows an overview of a network and a UE device.

Referring to the drawings, FIG. 1 shows an overview of a network and a UE device. Clearly in practice there may be many UE devices operating with the network but, for the sake of simplicity, FIG. 1 only shows a single UE device 100. For the purposes of illustration, FIG. 1 also shows a network 119 having a few components. It will be clear to a person skilled in the art that in practice a network will include far more components than those shown.

FIG. 1 shows an overview of the radio access network 119 (UTRAN) used in a UMTS system. The network 119 as shown in FIG. 1 comprises three Radio Network Subsystems (RNS) 2. Each RNS has a Radio Network Controller (RNC) 4. Each RNS 2 has one or more Node B 6 which are similar in function to a Base Transmitter Station of a GSM radio access network. User Equipment UE 100 may be mobile within the radio access network. Radio connections (indicated by the straight dotted lines in FIG. 1) are established between the UE and one or more of the Node Bs in the UTRAN.

The radio network controller controls the use and reliability of the radio resources within the RNS 2. Each RNC may also connected to a 3G mobile switching center 10 (3G MSC) and a 3G serving GPRS support node 12 (3G SGSN).

An RNC 4 controls one or more Node B's. An RNC plus its Node B's together make up an RNS 2. A Node B controls one or more cells. Each cell is uniquely identified by a frequency and a primary scrambling code (primary CPICH in FDD, primary CCPCH in TDD).

Generally in UMTS a cell refers to a radio network object that can be uniquely identified by a UE from a cell identifier that is broadcast over geographical areas from a UTRAN access point. A UTRAN access point is a conceptual point within the UTRAN performing radio transmission and reception. A UTRAN access point is associated with one specific cell i.e., there exists one UTRAN access point for each cell. It is the UTRAN-side end point of a radio link. A single physical Node B 6 may operate as more than one cell since it may operate at multiple frequencies and/or with multiple scrambling codes.

Figure 2:
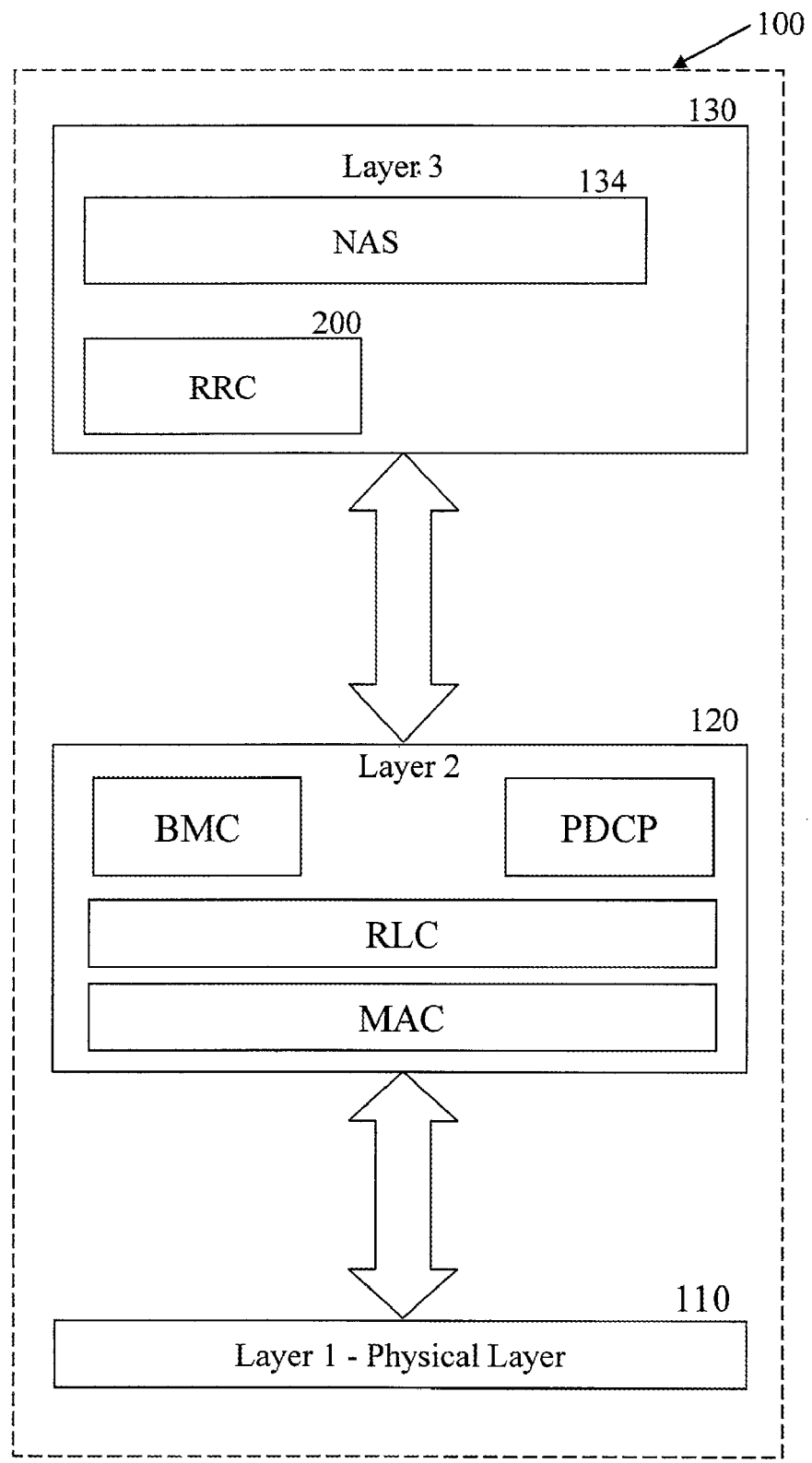
FIG. 2 is a block diagram illustrating an embodiment of a protocol stack provided in a UE.

FIG. 2 is a block diagram illustrating an embodiment of a protocol stack provided in a UE. A Radio Resource Controller (RRC) block 200 is a sub layer of Layer 3 130 of a UMTS protocol stack 100. The RRC 200 exists in the control plane only and provides an information transfer service to the non-access stratum NAS 134. The RRC 200 is responsible for controlling the configuration of radio interface Layer 1 110 and Layer 2 120. When the UTRAN wishes to change the UE configuration it will issue a message to the UE containing a command to invoke a specific RRC procedure. The RRC 200 of the UE decodes this message and initiates the appropriate RRC procedure. Generally when the procedure has been completed (either successfully or not) then the RRC sends a response message to the UTRAN (via the lower layers) informing the UTRAN of the outcome. It should be noted that there are a few scenarios where the RRC will not issue a response message to the UTRAN and, in those cases the RRC need not and does not reply.

The document referred to above (3GPP TSG—Services and System Aspects "Vocabulary for 3GPP Specifications (Release 1999)" 3GPP TS 21.905 v3.2.0) defines a radio bearer as "the service provided by Layer 2 for transfer of user data between User Equipment and UTRAN".

The MAC entity at layer 2 accesses the services of the physical layer though entities known as "Transport Channels".

Each radio bearer can have one RLC entity in the uplink toward UTRAN and one in the downlink from UTRAN to higher layers of the UE. Of the radio bearers RB0-4 are used for signaling purposes and RB0 does not normally have its configuration changed.

The RRC 200 of the UE 100 is also capable of acting upon instructions from users of its services, for example higher layers, to cause creation of an SDU (Service Data Unit). Such an SDU may for example comprise a response to the UTRAN to a request for reconfiguration of the UE. Such reconfiguration may include security configuration, radio bearer reconfiguration, transport channel reconfiguration or physical channel reconfiguration.

Typically such SDUs are submitted by the RRC 200 to Layer 2, and to the RLC (Radio link Control) 130 for being passed via the MAC layer 140 to the physical layer 110. The intention is that the SDUs be passed through the air interface to UTRAN, and up through corresponding layers to a layer of UTRAN that is a peer to the RRC 200 of the UE 100.

The RLC 130 provides various modes for data transfer. One of these, 'Acknowledged Mode' (AM), provides confirmation that all transmitted SDUs have been received successfully and uses various retry mechanisms to ensure this. Therefore, AM provides a reliable transport mechanism to higher layers, such as the RRC 200.

As noted above, the RLC layer 130 may, in certain circumstances, discard an SDU as specified in specification 25.322 clause 9.7.3. However, the specification 25.331 does not specify how the RRC 200 behaves if this happens.

The RRC 200 may implement several strategies to cope with SDU discard. These are summarized below, and then explained in detail subsequently, with reference to the drawings.

Two main cases can be identified for which the SDU discard behavior could be specified for the RRC in the 25.331 specification:

1. An RRC response message is submitted to lower layers, and the RRC is not required to wait for acknowledgement or confirmation. In this case, the RRC procedure "ends", which means that any discard may be ignored. The network and the UE can rely on UTRAN (and its timeouts) to proceed.

2. An RRC response message is submitted to lower layers, and the RRC is required to await acknowledgement or confirmation, e.g. from a receiving process in UTRAN [acknowledged mode, AM, as noted above]. This mode may be specified for security changes and for transition to CELL_PCH and URA_PCH. In this case, the procedure will only end or be completed afterwards. So if the acknowledgement is not received, the procedure is pending indefinitely if no behavior is specified where SDU_discard is configured.

Additionally there are identified cases in which the 25.331 specification states that a NAS message has to be retransmitted. See for example par. 8.1.8.2a, for the case of initial direct transfer after re-establishment and a inter-system handover. This does not relate to "SDU discard" but to other RLC conditions, and is well specified. As such, this case is not addressed here.

There are thus four different situations depending upon: a) whether SDU_DISCARD is configured or not, and b) whether the RRC is required to wait for acknowledgement or confirmation SDU DISCARD NOT Configured:

I) in case 1 (not waiting for acknowledgement): no action, as discard will go unnoticed, and to rely on current procedures in UTRAN.

II) in case 2 (acknowledged mode): In accordance with one aspect of the invention, the RRC may include a timer process, with a maximum time specified to await the successful confirmation of the transmission of the message submitted to the lower layer. Upon timeout, in accordance with the invention one of four behaviors may be initiated. If the lower layer returns a successful confirmation of having sent the SDU, the timer process is stopped, in one embodiment.

SDU DISCARD Configured:

III) in case 1 (not waiting for acknowledgement): Upon notification/indication of the discard condition, after the procedure has "ended", in accordance with the invention one of four behaviors may be initiated.

IV) in case 2 (acknowledged mode): Upon notification/indication of the discard condition while waiting for the successful confirmation of the submitted message to the lower layers, in accordance with the invention one of four behaviors may be initiated.

Retry and Cell-Update

Figure 3A:
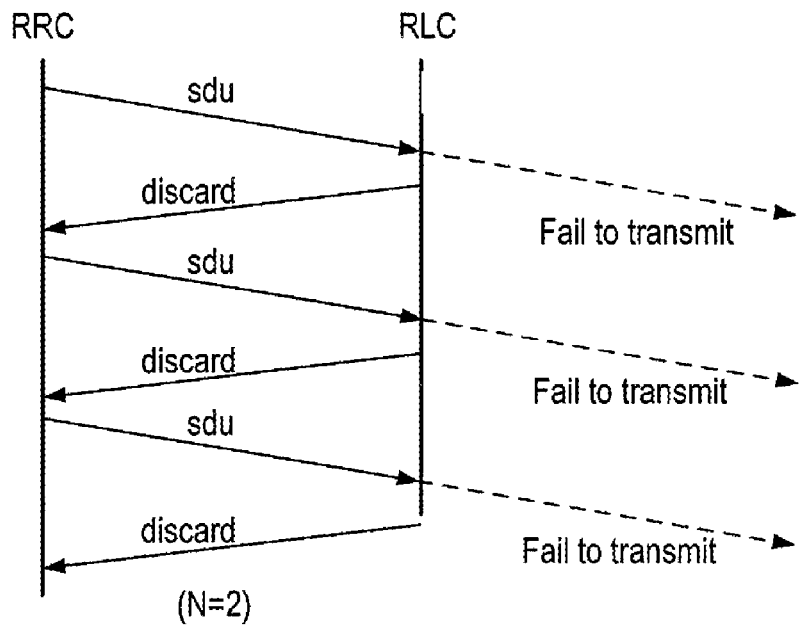
FIG. 3 shows examples of actions taken in response to discard of an SDU.
Figure 3B:
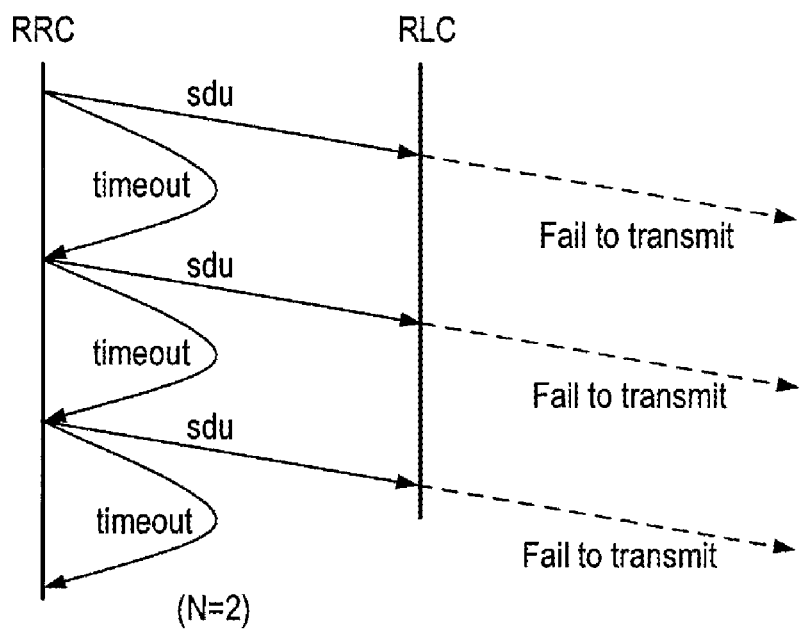
Figure 3C:
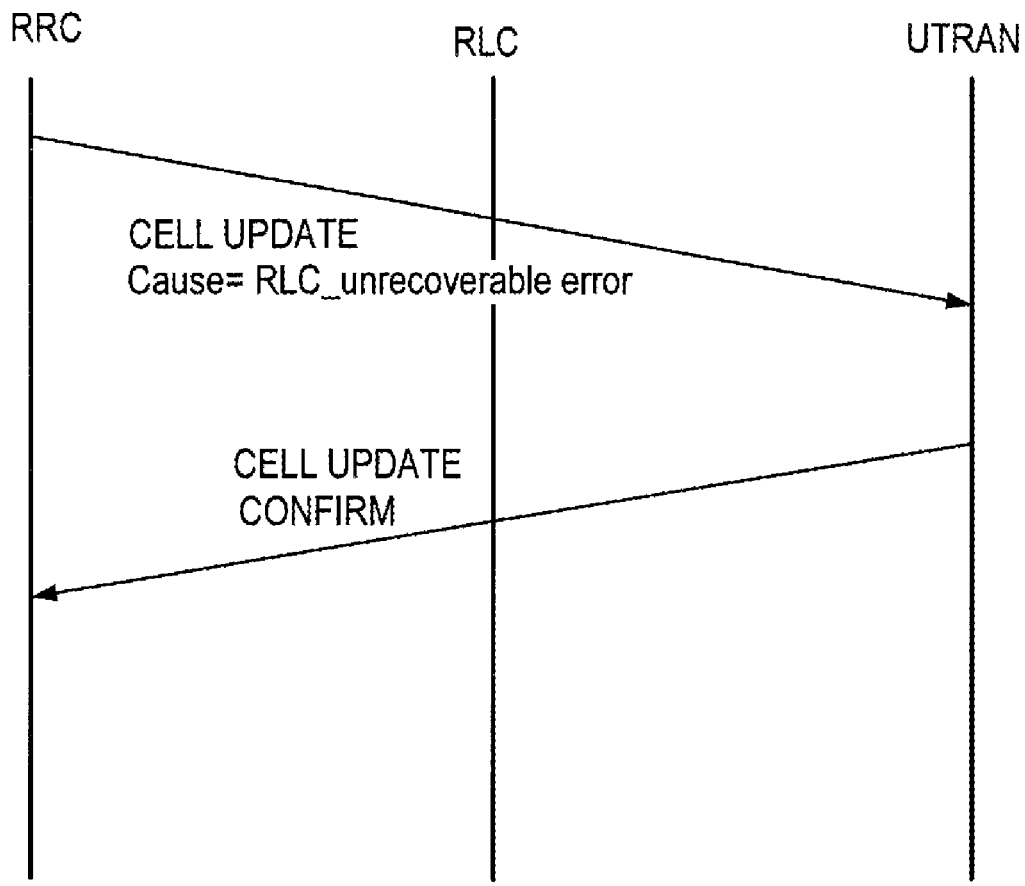

In a first class of embodiments, the RRC 200 re-submits the SDU (containing its message) to the RLC 130. This re-submission is performed N times, so that the SDU is submitted in all (N+1)times. If each time the SDU DISCARDED response is returned (or a timeout occurs first, see II above), then the RRC 200 behaves as though an RLC 130 un-recoverable error had occurred. The intention is that a Cell Update will be performed according to 25.331 specification, par. 8.3.1, with a cause of 'RLC unrecoverable error'. (This behavior is illustrated by one of FIG. 3a or FIG. 3b followed by FIG. 3c.)

To effect this, the UE 100 is set to a default configuration and state (cell_FACH) and the RRC 200 sends a CELL_UPDATE message over RB0 (Radio Bearer 0). This is a "reliable" method of communication in that, as noted above, generally RB0 normally has a static configuration and UTRAN remains receptive of messages on RB0 provided in connected-mode.

The UTRAN can then send a CELL UPDATE CONFIRM message back to UE 100, using channels that are known to be set up as part of the default state (cell_FACH). UTRAN then uses the CELL UPDATE CONFIRM to re-apply a configuration it was trying to apply when the problem happened, or alternatively it may take different action.

Par. 8.3.1.5 of 25.331 refers to the response made by UTRAN but the behavior of UTRAN is largely up to the implementer.

In one example of the different action, the UTRAN can respond to the 'RLC unrecoverable error' cause by requesting re-establishment of radio-bearers.

Moreover, the 'RLC unrecoverable error' cause means that if the RB has its default configuration, it will be configured for 'No Discard', and in that mode, when the criteria for SDU discard becomes true (for example if the SDU has been sent a certain number of times without a response), the RLC 130 will signal 'RLC unrecoverable error' to RRC 200 rather than signaling 'SDU discard'. Thus if the RB is configured in a non-default fashion such that Discard is configured, then the resulting behavior of the RRC will be very similar to the case where the RB did have the default configuration.

Figure 3D:
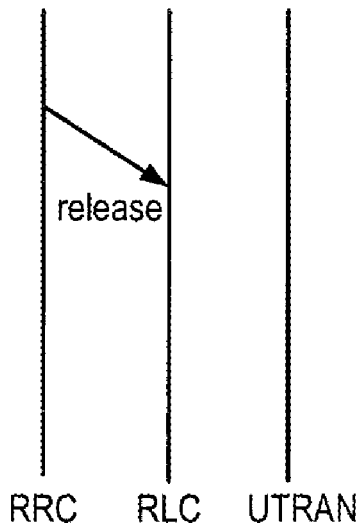

Retry and Return-to-Idle:

In the second class of embodiments the RRC 200 re-submits the SDU (containing its message) to the RLC 130. This re-submission is performed N times, so that the SDU is submitted in all (N+1) times. If each time the SDU DISCARDED response is returned (or a timeout occurs first, see II above), then the RRC 200 returns to idle mode by releasing the RRC connection and other typical actions taken when entering idle mode. (This behavior is illustrated by one of FIG. 3a or FIG. 3b followed by FIG. 3d.)

In a third class of embodiments, different actions occur depending upon a condition, e.g. whether security configuration was in progress or not. Where a security configuration is in progress, the RRC 200 re-submits the SDU (containing its message) to the RLC 130. This re-submission is performed N times, so that the SDU is submitted in all (N+1) times. If each time the SDU_DISCARDED response is returned (or a timeout occurs first, see II above), then the RRC 200 returns to idle mode by releasing the RRC connection and other typical actions taken when entering idle mode. If no security configuration is in progress, the RRC 200 re-submits the SDU (containing its message) to the RLC 130. This re-submission is performed N times, so that the SDU is submitted in all (N+1) times. If each time the SDU_DISCARDED response is returned (or a timeout occurs first, see II above), then the RRC 200 behaves as though an RLC 130 un-recoverable error had occurred.

It will be seen that this third class of embodiments is similar to the first and second class being employed alternatively depending upon whether security configuration is in progress or not.

Figure 3E:
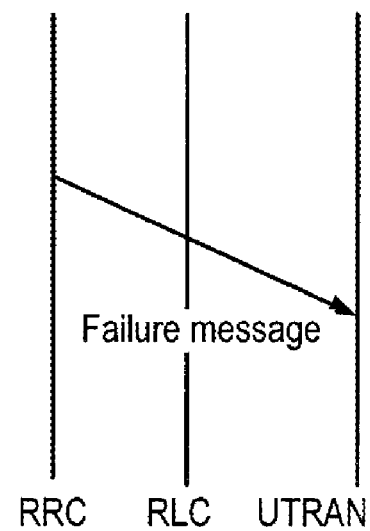

Retry and Send a Failure Response:

In the fourth class of embodiments, the RRC 200 re-submits the SDU (containing its message) to the RLC 130. This re-submission is performed N times, so that the SDU is submitted in all (N+1) times. If each time the SDU_DISCARDED response is returned or the timeout in case II), then the RRC sends a failure response message for the ongoing procedure (e.g. RADIO_BEARER_RECONFIGURATION_FAILURE in case of a RADIO_BEARER_RECONFIGURATION procedure). This behavior is similar to other specified failure cases of such procedures. (This behavior is illustrated by one of FIG. 3a or FIG. 3b followed by FIG. 3e.)

To keep the current behavior consistent for case III above, in one embodiment the UE considers the procedure as completed successfully, as the procedure has already ended in this case. Hence UE 100 does not try to revert to any old configuration.

For cases II) and IV), the UE considers the procedures as not completed successfully, and finalizes the ongoing procedure in the way of other specified failure cases.

Figure 3F:
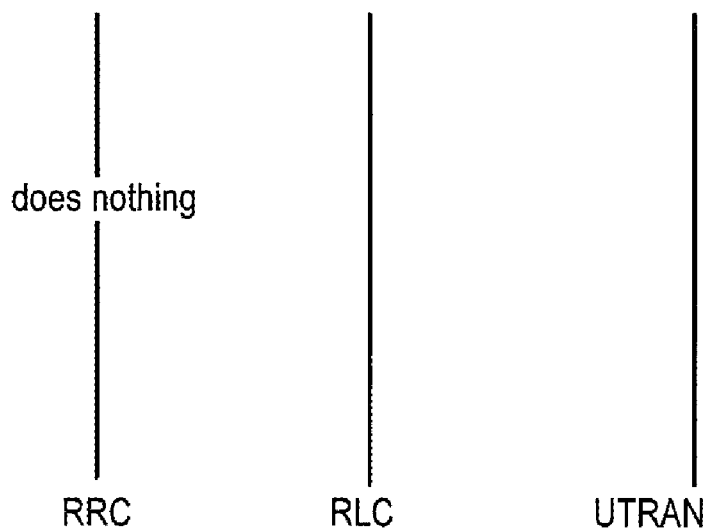

If the transmission of the failure response message then fails, then the device may use any of the first or second class of embodiments as its next action, or alternatively adopt a further strategy, namely "Retry and do-nothing". In this strategy the RRC 200 re-submits the SDU (containing its message) to the RLC 130. This re-submission is performed N times, so that the SDU is submitted in all (N+1) times. If each time the SDU_DISCARDED response is returned or the timeout in case II), then the RRC considers the procedure has ended "successfully", and relies on current procedures in UTRAN. (This behavior is illustrated by one of FIG. 3a or FIG. 3b followed by FIG. 3f.)

It is envisaged that for each of the classes of embodiments above the value of N may advantageously be set to 0.

Thus for the first class of embodiments, as soon as SDU DISCARDED is detected by the RRC 200 then a Cell Update would be performed.

Other values could be used but this would complicate conformance testing of the RLC/RRC protocol, and would also increase traffic loading during error situations.

Figure 4:
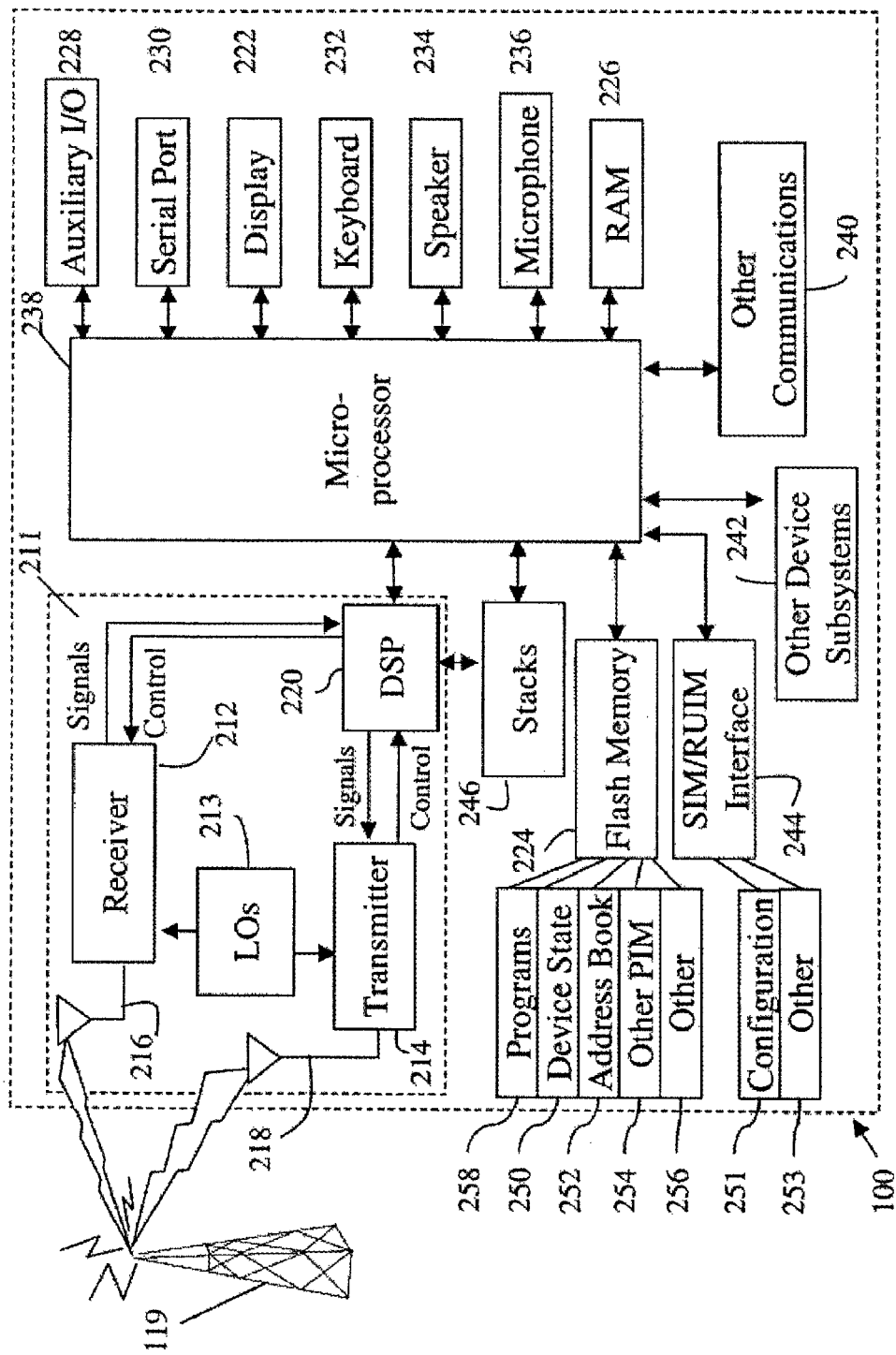
FIG. 4 is a block diagram illustrating a mobile device, which can act as a UE and co-operate with the apparatus and methods of FIGS. 1 and 2.

Turning now to FIG. 4, FIG. 4 is a block diagram illustrating a mobile device, which can act as a UE, and which is an exemplary wireless communication device. Mobile station 100 is preferably a two-way wireless communication device having at least voice and data communication capabilities. Mobile station 100 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 100 is enabled for two-way communication, it will incorporate a communication subsystem 211, including both a receiver 212 and a transmitter 214, as well as associated components such as one or more, preferably embedded or internal, antenna elements 216 and 218, local oscillators (LOs) 213, and a processing module such as a digital signal processor (DSP) 220. As will be apparent to those skilled in the field of communications, the particular design of the communication subsystem 211 will be dependent upon the communication network in which the device is intended to operate. For example, mobile station 100 may include a communication subsystem 211 designed to operate within the Mobitex™ mobile communication system, the DataTAC™ mobile communication system, GPRS network, UMTS network, or EDGE network.

Network access requirements will also vary depending upon the type of network 119. For example, in the Mobitex and DataTAC networks, mobile station 100 is registered on the network using a unique identification number associated with each mobile station. In UMTS and GPRS networks, however, network access is associated with a subscriber or user of mobile station 100. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 100 will be unable to carry out any other functions involving communications over the network 119. The SIM interface 244 is normally similar to a card-slot into which a SIM card can be inserted and ejected like a diskette or PCMCIA card. The SIM card can have approximately 64K of memory and hold many key configuration 251, and other information 253 such as identification, and subscriber related information.

When required network registration or activation procedures have been completed, mobile station 100 may send and receive communication signals over the network 119. Signals received by antenna 216 through communication network 119 are input to receiver 212, which may perform such common receiver functions as signal amplification, frequency down conversion, filtering, channel selection and the like, and in the example system shown in FIG. 4, analog to digital (A/D) conversion. A/D conversion of a received signal allows more complex communication functions such as demodulation and decoding to be performed in the DSP 220. In a similar manner, signals to be transmitted are processed, including modulation and encoding for example, by DSP 220 and input to transmitter 214 for digital to analog conversion, frequency up conversion, filtering, amplification and transmission over the communication network 119 via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Mobile station 100 preferably includes a microprocessor 238 which controls the overall operation of the device. Communication functions, including at least data and voice communications, are performed through communication subsystem 211. Microprocessor 238 also interacts with further device subsystems such as the display 222, flash memory 224, random access memory (RAM) 226, auxiliary input/output (I/O) subsystems 228, serial port 230, keyboard 232, speaker 234, microphone 236, a short-range communications subsystem 240 and any other device subsystems generally designated as 242.

Some of the subsystems shown in FIG. 4 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list.

Operating system software used by the microprocessor 238 is preferably stored in a persistent store such as flash memory 224, which may instead be a read-only memory (ROM) or similar storage element (not shown). Those skilled in the art will appreciate that the operating system, specific device applications, or parts thereof, may be temporarily loaded into a volatile memory such as RAM 226. Received communication signals may also be stored in RAM 226.

As shown, flash memory 224 can be segregated into different areas for both computer programs 258 and program data storage 250, 252, 254 and 256. These different storage types indicate that each program can allocate a portion of flash memory 224 for their own data storage requirements. Microprocessor 238, in addition to its operating system functions, preferably enables execution of software applications on the mobile station. A predetermined set of applications that control basic operations, including at least data and voice communication applications for example, will normally be installed on mobile station 100 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 119. In a preferred embodiment, the PIM data items are seamlessly integrated, synchronized and updated, via the wireless network 119, with the mobile station user's corresponding data items stored or associated with a host computer system. Further applications may also be loaded onto the mobile station 100 through the network 119, an auxiliary I/O subsystem 228, serial port 230, short-range communications subsystem 240 or any other suitable subsystem 242, and installed by a user in the RAM 226 or preferably a non-volatile store (not shown) for execution by the microprocessor 238. Such flexibility in application installation increases the functionality of the device and may provide enhanced on-device functions, communication-related functions, or both. For example, secure communication applications may enable electronic commerce functions and other such financial transactions to be performed using the mobile station 100.

In a data communication mode, a received signal such as a text message or web page download will be processed by the communication subsystem 211 and input to the microprocessor 238, which preferably further processes the received signal for output to the display 222, or alternatively to an auxiliary I/O device 228. A user of mobile station 100 may also compose data items such as email messages for example, using the keyboard 232, which is preferably a complete alphanumeric keyboard or telephone-type keypad, in conjunction with the display 222 and possibly an auxiliary I/O device 228. Such composed items may then be transmitted over a communication network through the communication subsystem 211.

For voice communications, overall operation of mobile station 100 is similar, except that received signals would preferably be output to a speaker 234 and signals for transmission would be generated by a microphone 236. Alternative voice or audio I/O subsystems, such as a voice message recording subsystem, may also be implemented on mobile station 100. Although voice or audio signal output is preferably accomplished primarily through the speaker 234, display 222 may also be used to provide an indication of the identity of a calling party, the duration of a voice call, or other voice call related information for example.

Serial port 230 in FIG. 4, would normally be implemented in a personal digital assistant (PDA)-type mobile station for which synchronization with a user's desktop computer (not shown) may be desirable, but is an optional device component. Such a port 230 would enable a user to set preferences through an external device or software application and would extend the capabilities of mobile station 100 by providing for information or software downloads to mobile station 100 other than through a wireless communication network. The alternate download path may for example be used to load an encryption key onto the device through a direct and thus reliable and trusted connection to thereby enable secure device communication.

Other communications subsystems 240, such as a short-range communications subsystem, is a further optional component which may provide for communication between mobile station 100 and different systems or devices, which need not necessarily be similar devices. For example, the subsystem 240 may include an infrared device and associated circuits and components or a BluetoothTM communication module to provide for communication with similarly enabled systems and devices.

When mobile device 100 is used as a UE, protocol stacks 246 include apparatus and a method for operating a device in a mobile communications network, the device operating using a protocol having a physical layer, and at least a higher and a lower intermediate layer, wherein the higher layer is arranged to submit an SDU to the lower layer for communication using the physical layer, wherein said SDU comprises information indicative of a process Extensions and Alternatives In the foregoing specification, the invention has been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods as described have shown steps being carried out in a particular order. However, it would be clear to a person skilled in the art that the order of the evaluation is immaterial with respect to the operation of the method. The ordering of the steps as described herein is not intended to be limiting.

It is also to be noted that where a method has been described it is also intended that protection is also sought for a device arranged to carry out the method and where features have been claimed independently of each other these may be used together with other claimed features.

What we claim is:

1. A method of operating a user equipment (UE) configurable for use in a Universal Mobile Telecommunications System (UMTS), the UE comprising a physical layer, a user layer, a radio resource control (RRC) layer, and a radio link control (RLC) layer compliant for use in a UMTS, comprising:

submitting, from the RRC layer, an SDU to the RLC layer for transmission;
measuring elapsed time since the SDU was submitted in the RRC layer;
detecting that the elapsed time has reaching a predetermined timeout value;
causing the RRC layer to resubmit the previously submitted SDU to the RLC layer;
measuring the elapsed time since the resubmitted SDU was resubmitted to the RLC layer;
repeating the resubmission and associated elapsed time at most N times; and
causing the RRC layer to submit a failure response message for the ongoing procedure to the RLC layer for transmission, if there have been N resubmissions.

2. The method of claim 1 comprising:
setting an operating mode wherein an acknowledgement of successful reception of said SDU is awaited.

3. The method of claim 1 wherein N=0.

4. The method of claim 1 wherein when a RADIO_BEARER_RECONFIGURATION procedure is being undertaken, the failure response message submitted by the RRC layer is a RADIO_BEARER_RECONFIGURATION_FAILURE message.

5. A user equipment (UE) configurable for use in a Universal Mobile Telecommunications System (UMTS), the UE comprising a physical layer, a user layer, a radio resource control (RRC) layer, and a radio link control (RLC) layer compliant for use in a UMTS, the user equipment being arranged to:

submit, from the RRC layer, an SDU to the RLC layer for transmission;
measure elapsed time since the SDU was submitted in the RRC layer;
detect that the elapsed time has reaching a predetermined timeout value;
cause the RRC layer to resubmit the previously submitted SDU to the RLC layer;
measure the elapsed time since the resubmitted SDU was resubmitted to the RLC layer;
repeat the resubmission and associated elapsed time at most N times; and
cause the RRC layer to submit a failure response message for the ongoing procedure to the RLC layer for transmission, if there have been N resubmissions.

6. The user equipment of claim 5 further arranged to:
setting an operating mode wherein an acknowledgement of successful reception of said SDU is awaited.

7. The user equipment of claim 5 wherein N=0.

8. The user equipment of claim 5 wherein when a RADIO_BEARER_RECONFIGURATION procedure is being undertaken, the failure response message submitted by the RRC layer is a RADIO_BEARER_RECONFIGURATION_FAILURE message.

* * * * *